United States Patent [19]
Chapman

[11] Patent Number: 5,837,022
[45] Date of Patent: Nov. 17, 1998

[54] HIGH EFFICIENCY AIR FILTER SYSTEM

[76] Inventor: Rick L. Chapman, 1977 Valley Meadow, Oak View, Calif. 93022

[21] Appl. No.: 858,730

[22] Filed: May 19, 1997

[51] Int. Cl.[6] .................................................. B01D 46/00
[52] U.S. Cl. ................................ 55/496; 55/497; 55/502; 55/507; 55/508; 55/511; 55/517; 55/DIG. 31; 55/DIG. 35
[58] Field of Search .............................. 55/493, 496, 497, 55/502, 507, 508, 509, 511, 513, 517, DIG. 31, DIG. 35

[56] References Cited

U.S. PATENT DOCUMENTS

| | | | |
|---|---|---|---|
| 3,675,402 | 7/1972 | Weed | 55/DIG. 31 |
| 4,601,737 | 7/1986 | Gerbig | 55/DIG. 31 |
| 5,188,646 | 2/1993 | Nolen, Jr. | 55/DIG. 31 |
| 5,364,458 | 11/1994 | Burnett et al. | 55/496 |
| 5,429,116 | 7/1995 | Brown | 55/DIG. 36 |
| 5,476,526 | 12/1995 | Attermeyer | 55/DIG. 31 |

FOREIGN PATENT DOCUMENTS

| | | | |
|---|---|---|---|
| 2053144A1 | 1/1993 | Canada | 55/DIG. 31 |
| 406269624A | 9/1994 | Japan | 55/DIG. 31 |

*Primary Examiner*—Jay H. Woo
*Assistant Examiner*—Minh-Chau T. Pham
*Attorney, Agent, or Firm*—Marvin E. Jacobs

[57] ABSTRACT

This invention relates to improving the efficiency of air filter systems that incorporate adjustable air filter frames having telescoping frame sections. In such systems, an air bypass space exists between the frame and the filter frame support member in the air duct. This invention provides an air bypass clip that is inserted between the filter element contained in the adjustable air filter frame and the frame support member. The air bypass clip has a sealing lip which bears against the support member thus blocking the flow of bypass air between the adjustable frame and the support member.

16 Claims, 2 Drawing Sheets

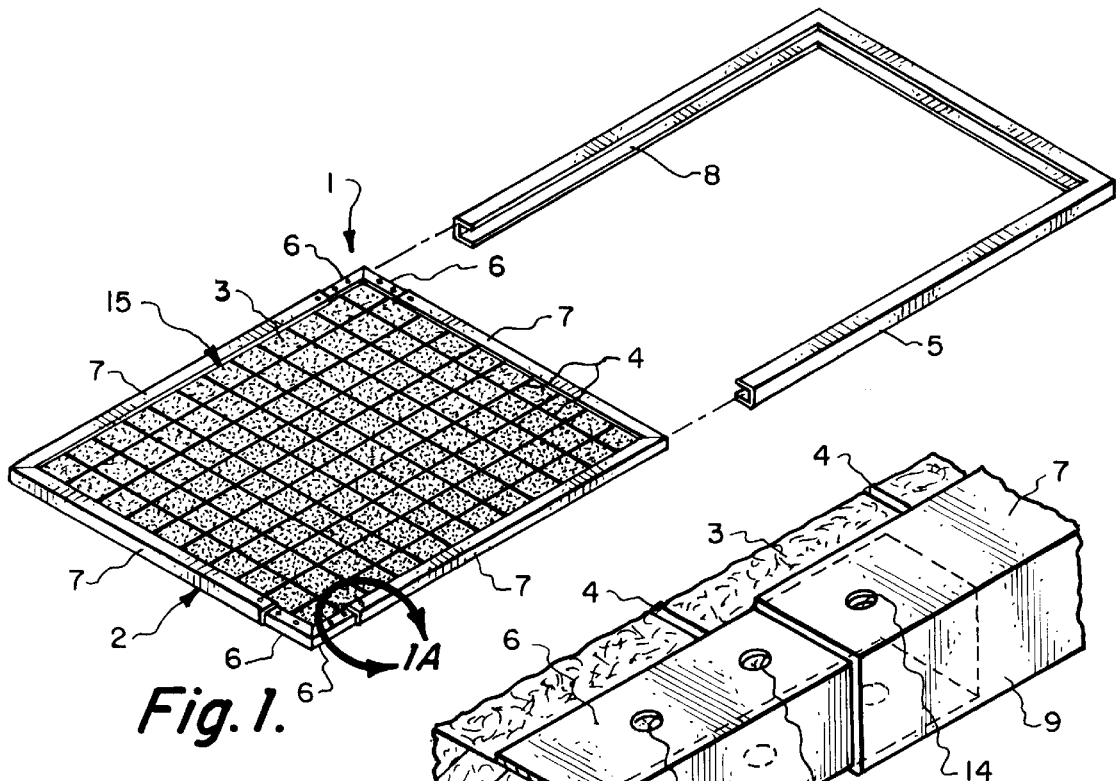
Fig. 1.
Fig. 1A.
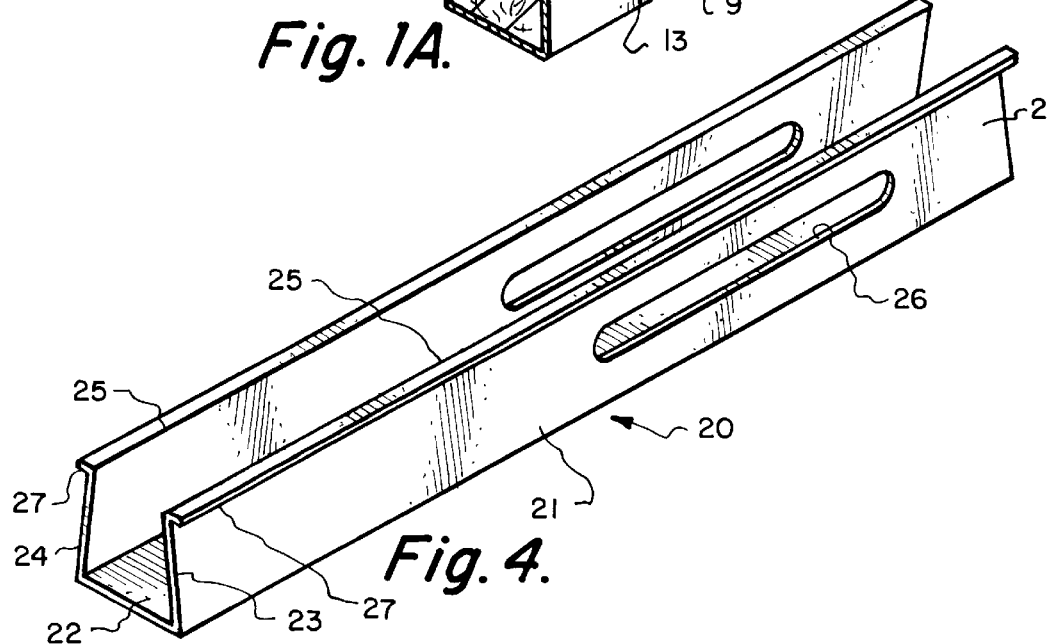
Fig. 4.

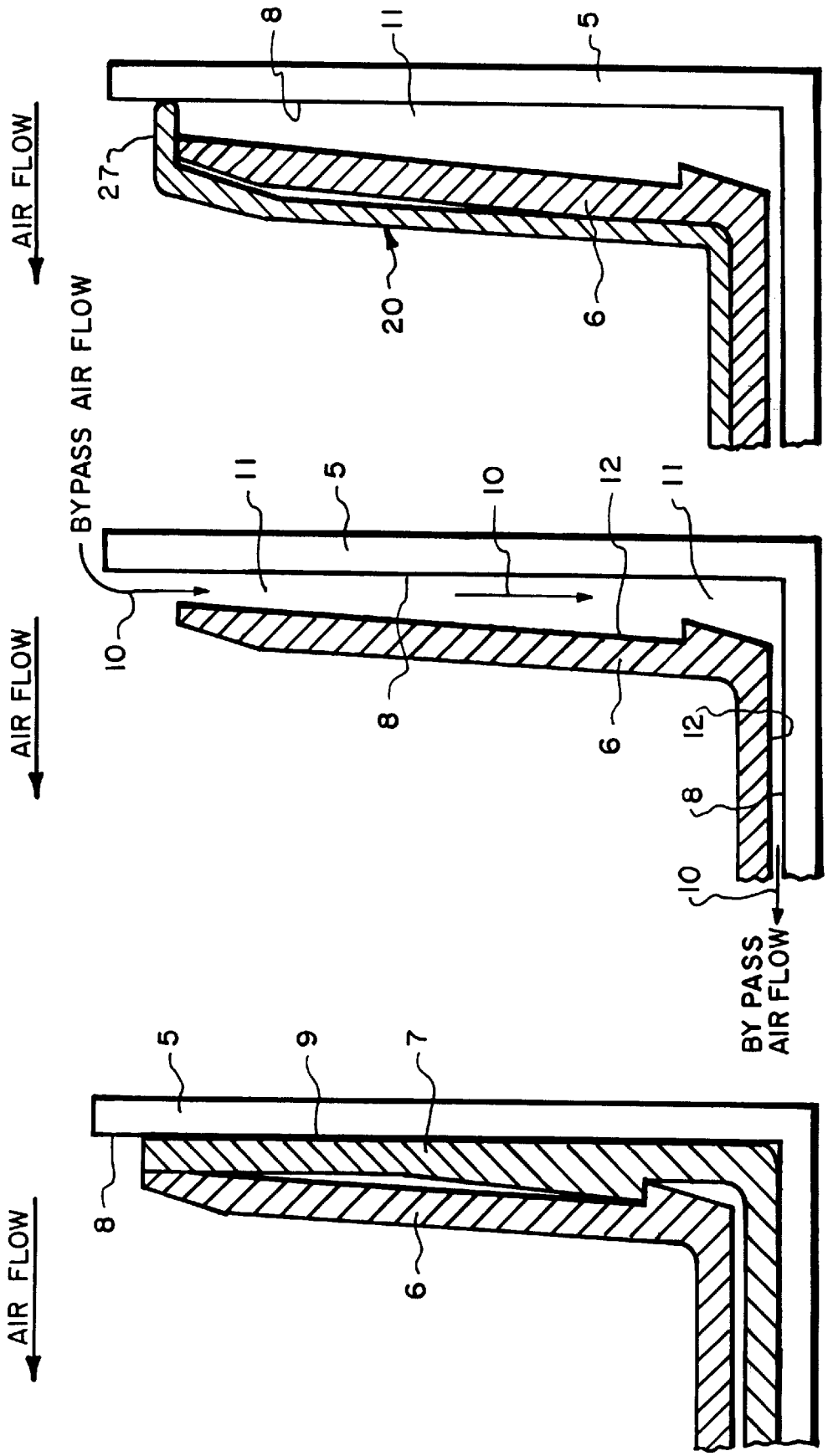

HIGH EFFICIENCY AIR FILTER SYSTEM

Technical Field

The present invention relates to air filter systems and more specifically to filter systems having adjustable air filter frames.

BACKGROUND OF THE INVENTION

Many air filters for residential heating and air conditioning systems are provided with an adjustable filter frame. The conventional air filter is formed of a frame which contains a filter element. The frame provides structural rigidity so that the filter element can be effectively positioned in the air stream. Typically two grills are used to sandwich the filter element (s) providing further structural support for the filter element. The filter frame, with its grills and filter element (s), is typically slid into a structurally rigid filter frame support member in the air duct to place and retain the filter in an appropriate location for filtering the input or circulating air. The adjustable feature of the frame provides for the use of the frame in a broad variety of duct configurations.

With any air filter positioned in an air stream at high velocities, the resistance of the air filter must be relatively low. In their new or unused condition the resistance of most of these types of filters is 0.20 inches of water, or below, at standard flow rates of 300 cubic feet per minute. Of course as the filters are used they become partially clogged with dust and other particulates and the resistance of the filter increases.

The very feature that leads to the popularity of the adjustable frame filters also, unfortunately, produces a low resistance bypass path for the circulating air. Typically these adjustable frames have telescoping sections with an inner telescoping section having a smaller cross-section than the outer telescoping section into which it enters. When this adjustable frame filter is placed in the filter frame support member in the air duct, the outer, large cross-section telescoping section firmly seats against the inside of the filter frame support member. On the other hand, the smaller cross-sectioned inner telescoping section does not fit snugly with the interior surface of the filter frame support member and a significant gap, or air bypass space, is developed. This air bypass space provides a low resistance path for the air to follow. Thus air bypasses the filter element by flowing between the support member and the filter frame. This reduces the efficiency of the air filter system and increases the cost of the filtering operation.

To prevent this air bypass around the filter element, a means is required to introduce a high resistance in the air bypass space.

STATEMENT OF THE PRIOR ART

No relevant prior art is known that has application to reducing the bypass air flow encountered with adjustable frame air filter systems.

STATEMENT OF THE INVENTION

This invention comprises the adjustable air filter frame and filter frame support member as described above with the critical addition of an air bypass clip designed and fitted so as to close the air bypass space between the inner telescoping frame section and the interior surface of the filter support member. The clip is comprised of U-shaped channel member having a length somewhat exceeding the portion of the inner telescoping frame section that is outside of the outer telescoping frame section. This clip is typically fabricated from the same materials as the filter frame, most often a synthetic plastic resin. The U-shaped section of the clip has a lip on each side of the open end of the "U". This lip extends outwardly towards the interior surface of the filter frame support member. The clip fits snugly within the inner section of the telescoping frame member and the outwardly extending lip seals against the interior surface of the filter frame support member. Thus the seal provided by the lip bearing against the interior surface of the filter frame support member substantially increases the resistance to air flow through what is a relatively open, low resistance air bypass space without the clip. The lip sealing against the filter frame support member causes the air flow to be fully directed through the filter element thus significantly increasing the overall filtering efficiency of the air filter system.

These and many other features and attendant advantages of the invention will become apparent as the invention becomes better understood by reference to the following detailed description when considered in conjunction with the accompanying drawings.

BRIEF DESCRIPTION OF THE DRAWINGS

FIG. 1 is an assembly view of a conventional adjustable air filter frame containing a filter and upper and lower supporting grills;

FIG. 1A is an enlarged view of the filter frame support member taken along line 1A of FIG. 1;

FIG. 2 is a cross-sectional view of a portion of the conventional air filter frame and the filter frame support member at the point where the inner and outer telescoping sections overlap;

FIG. 3 is a cross-sectional view of a portion of the conventional filter frame and filter frame support member at a point where the inner frame section is outside the outer frame section;

FIG. 4 is a depiction of the air bypass clip; and

FIG. 5 is a cross-sectional view of a portion of the air filter frame and filter frame support member with the air bypass clip installed where the inner frame section is outside the outer frame section.

DETAILED DESCRIPTION OF THE INVENTION

Referring now to FIG. 1, a conventional adjustable air filter system 1 comprises an air filter frame 2 and a support member 5. FIG. 1 shows the adjustable air filter frame 2 removed from the filter frame support member 5. Adjustable frame 2 contains a filter element 3 and supporting upper and lower grills 4 (only the upper grill shows in this perspective) forming a filter element and grill assembly 15. In this assembly 15, the air filter element 3 is sandwiched between upper and lower grills 4 and these three components are retained by the adjustable filter frame 2. When the air filter frame 2 is inserted into filter frame support member 5, the filter element 3 is properly positioned and retained in the air stream to be filtered.

Continuing reference to FIG. 1, the inner telescoping frame section 6 and outer telescoping frame section 7 allow the air filter frame to be adjusted to fit a variety of air duct cross-sections. The filter element and grill assembly 15 is readily cut to fit the adjusted size of the air filter frame 2. After the components are properly adjusted, they are secured together with a fastener, such as a nut and bolt (not shown) through aligned holes 13, 14 of the inner and outer telescoping frame sections 6, 7.

FIG. 2 is a cross-sectional view of a portion of the air filter system 1 with the adjustable frame 2 inserted in the filter frame support member 5. The cross-section of FIG. 2 is taken at a point where the telescoping frame sections 6, 7 overlap within the filter frame support member 5. FIG. 2 illustrates the close fit of the outer telescoping frame section 7 and its exterior surface 9 with the interior surface 8 of the filter frame support member 5. This close fit creates a high resistance to the flow of air that might otherwise bypass the filter element 3 through a air bypass space between the interior surface 8 of filter frame support member 5 and the exterior surface 9 of the outer telescoping frame section 7.

A cross-sectional view of the conventional adjustable filter frame 2 and filter frame support member 5 at a point on the inner frame section 6 where it is outside the outer frame section 7 is shown in FIG. 3. This figure clearly depicts the substantial bypass air flow 10 through air bypass space 11. Air bypass space 11 is the open space between the interior surface 8 of the filter frame support member 5 and the exterior surface 12 of the inner telescoping frame section 6. Air bypass space 11 is the space that would otherwise be filled by the outer telescoping frame member 7 when the two section 6, 7 overlap. Because the smaller cross-sectioned inner telescoping section 6 does not fit snugly with the interior surface 8 of the filter frame support member 5, a significant air bypass space 11 is developed. Thus efficiency of the air filter assembly 1 is significantly reduced and the cost of the filtering operation increases.

This invention resolves the problem of the bypass air flow 10 by increasing the resistance to the flow of air bypass space 11 by providing an air bypass sealing clip 20. Conventional adjustable air filter frames 2 are rectangular and adjustable on all four sides, thus four air bypass spaces 11 exist and four air bypass sealing clips 20 are required for each adjustable frame 2.

The preferred embodiment of one of the four identical air bypass sealing clips 20 is shown in FIG. 4. The air bypass sealing clips 20 each comprise an elongated channel member 21 having a base 22, a first side 23 and a second side 24, both sides depending from base 22, thereby forming a U-shaped cross-section of the channel member 21. The first and second sides 23, 24 of the air bypass sealing clip 20 have a longitudinal outer edge 25 parallel to and opposite the base 22. Continuing reference to FIG. 4, the first and second sides 23, 24 also each include an elongated longitudinal slot 26 between the base 22 and the longitudinal outer edge 25. Also shown in FIG. 4, each of the two longitudinal outer edges 25 has an outwardly extending sealing lip 27. As described in detail later, this sealing lip 27 is used to provide a seal against the interior surface 8 of filter frame support member 5. With this seal, bypass air flow between air filter frame 2 and the filter frame support member 5 is prevented.

Referring now to FIGS. 1 and 4, in assembling the air filter system 1, the first of four air bypass clips 20 is slipped over the filter element and grill assembly 15 on one side of the rectangular assembly in close proximity to one corner of the rectangle. A second air bypass clip is placed over the filter element grill assembly 15 on the second side of the rectangle adjacent to the location of the first clip 20. This second clip 20 is in close proximity to the same corner as the first air bypass clip 20. In a similar fashion, the other two air bypass clips are slipped over the remaining two sides of the filter element grill assembly 15 at the diagonally opposite corner of the rectangle. Thus the sandwiched components of the filter element 3 and upper and lower grills 4 are held securely in place by the four air bypass clips so that the inner and outer telescoping sections 6, 7 of adjustable air filter frame 2 may be assembled over the filter element 3 and grills 4.

The effectiveness of the clips 20 in securing the filter element and grill assembly 15 is enhanced by the inward angle of the sides 23, 24 which provide a spring-like bias which slightly compresses the filter element and grill assembly 15.

The use of the four clips 20 as a tool to secure the filter element and grill assembly 15 during the assembly of the air filter frame 2 is an important feature and value of the air bypass clip 20 in addition to its primary purpose of increasing the operating efficiency of the air filter system 1. This use of the bypass clip 20 is even more beneficial when multiple layers of filtering elements 3, or filter screens, are introduced between the grills 4.

Continuing reference to FIGS. 1 and 4, with the filter element and grill assembly 15 secured with the four air bypass clips 20, the inner telescopic frame sections 6 are next slipped over the air bypass clips 20 and then inserted into the outer telescoping frame sections 7. After the inner telescoping frame sections 6 have been fully inserted into their cooperating outer telescopic frame sections 7, four fasteners are inserted through holes 13, 14 and elongated longitudinal slots 26 to secure as a single unit the telescoping frame sections 6, 7 and air bypass clips 20. Next the air filter system 1, with the adjustable air filter frame 2 and filter element and grill assembly 15 included, is ready to be inserted into the filter frame support member 5 as shown in FIG. 1.

The utility and effectiveness of the air bypass clip 20 when used in conjunction with the adjustable air filter frame 2 and the filter and grill assembly 15 is made explicit by reference to FIG. 5. FIG. 5 is a cross-sectional view of a portion of the air filter frame and filter frame support member 5, with the air bypass clip 20 installed at the point where the inner frame section is outside the outer frame section. Of particular interest in FIG. 5 is the depiction of the outwardly extending sealing lip 27 bearing against the interior surface 8 of filter frame support member 5. It is clear that the resistance to bypass air flow 10 of the air bypass space 11 is substantially increased, effectively eliminating air bypass flow 10 and thus allowing the air filter system 1 to operate at its maximum efficiency.

It is to be realized that only preferred embodiments of this invention have been described, and that numerous substitutions, modifications, alterations, and applications are permissible without departing from the spirit and scope of the invention as defined in the following claims.

I claim:

1. A high efficiency air filter system comprising:
    a filter frame support member having an interior surface;
    an adjustable air filter frame having a plurality of inner and outer telescoping sections, said inner telescoping sections having an exterior surface, said adjustable air filter frame being retained by said filter frame support member;
    a filter element supported by the telescoping sections of said frame;
    said filter frame support member and said adjustable air filter frame defining an air bypass space therebetween; and
    a plurality of air bypass sealing clips between the inner telescoping sections of said adjustable air filter frame and said filter element and grill assembly, said bypass clips further being sealingly fitted against the interior surface of said filter frame support member thereby preventing the flow of air through said air bypass space.

2. An air filter system according to claim 1 wherein said air bypass sealing clips each comprise:

an elongated channel member having a base and first and second sides depending from said base thereby forming a U-shaped cross-section of said channel member;

said first and second sides each having a longitudinal outer edge parallel to and opposite said base; and each of said longitudinal outer edges having an outwardly extending sealing lip, sealingly fitted against the interior surface of said filter thereby preventing the passage of air between the exterior surface of the inner telescoping frame sections and the interior surface of the said filter frame support member.

3. An air filter system according to claim 2 wherein said first and second sides angle inwardly toward each other from said base to the longitudinal edges of said sides.

4. An air filter system according to claim 3 wherein said first and second sides each include an elongated longitudinal slot between said base and said longitudinal outer edge for receiving a securing device for said adjustable frame.

5. An air filter system according to claim 4 wherein said air bypass sealing clip is fabricated from a synthetic plastic resin.

6. An air bypass sealing clip for an adjustable air filter frame retained by a filter frame support member comprising:

an elongated channel member having a base and first and second sides depending from said base thereby forming a U-shaped cross-section of said channel member;

said first and second sides each having a longitudinal outer edge parallel to and opposite said base; and each of said longitudinal outer edges having an outwardly extending sealing lip, sealingly fitted against said filter thereby preventing the passage of air between said air filter frame and said filter frame support member.

7. An air bypass sealing clip according to claim 6 wherein said first and second sides angle inwardly toward each other from said base to the longitudinal edges of said sides.

8. An air bypass sealing clip according to claim 7 wherein said first and second sides each include an elongated longitudinal slot between said base and said longitudinal outer edge for receiving a securing device for said adjustable air filter frame.

9. An air filter assembly according to claim 8 wherein said air bypass sealing clip is fabricated from a synthetic plastic resin.

10. A high efficiency air filter system having an adjustable air filter frame supported in a filter frame support member having an interior surface, the frame having inner and outer telescoping sections and a filter element supported by the telescoping sections of the frame, the filter frame support member and the adjustable frame defining an air bypass space therebetween, wherein the improvement comprises:

a plurality of air bypass sealing clips between the inner telescoping sections of said adjustable air filter frame and said filter element and grill assembly, said bypass clips further being sealingly fitted against the interior surface of said filter frame support member thereby preventing the flow of air through said air bypass space.

11. A high efficiency air filter system according to claim 10 wherein said air bypass sealing clips each comprise:

an elongated channel member having a base and first and second sides depending from said base thereby forming a U-shaped cross-section of said channel member;

said first and second sides each having a longitudinal outer edge parallel to and opposite said base; and each of said longitudinal outer edges having an outwardly extending sealing lip, sealingly fitted against the interior surface of said filter thereby preventing the passage of air through said air bypass space.

12. An air bypass sealing clip according to claim 11 wherein said first and second sides angle inwardly toward each other from the base to the longitudinal edges of said sides.

13. An air bypass sealing clip according to claim 12 wherein said first and second sides each include an elongated longitudinal slot between said base and said longitudinal outer edge for receiving a securing device for said adjustable air filter frame.

14. An air filter assembly according to claim 13 wherein said air bypass sealing clip is fabricated from a synthetic plastic resin.

15. A high efficiency system according to claim 1 in which the filter element includes a grill assembly.

16. A high efficiency system according to claim 10 in which the filter element includes a grill assembly.

* * * * *